UNITED STATES PATENT OFFICE.

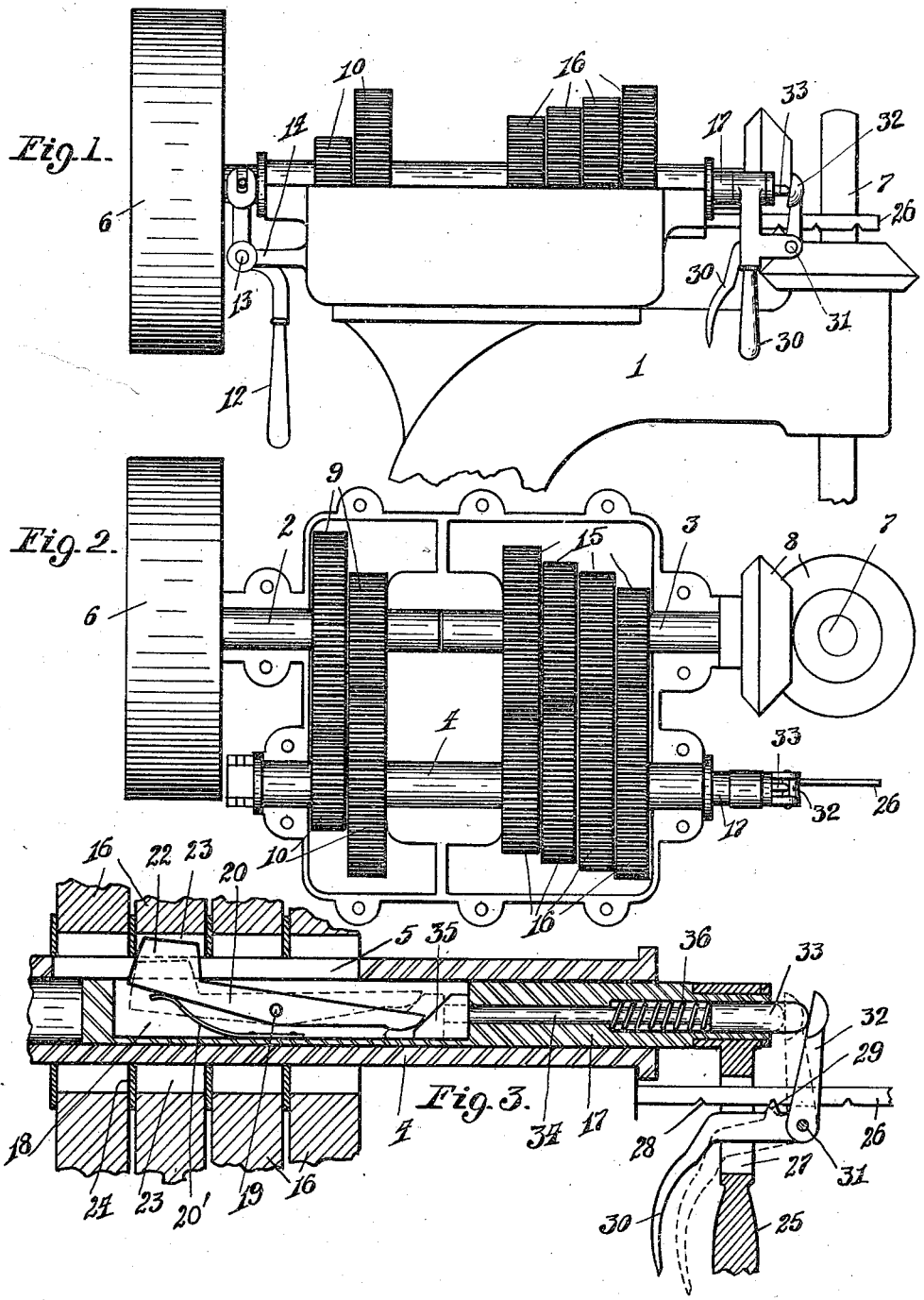

WILLIAM H. HOLLAND, OF SOUTH BEND, INDIANA.

SPEED-CHANGING MECHANISM.

965,461.   Specification of Letters Patent.   Patented July 26, 1910.

Application filed November 20, 1909. Serial No. 529,017.

*To all whom it may concern:*

Be it known that I, WILLIAM H. HOLLAND, a citizen of the United States, residing at South Bend, in the county of St. Joseph and State of Indiana, have invented certain new and useful Improvements in Speed-Changing Mechanisms, of which the following is a specification.

This invention relates to speed changing mechanisms.

One object of the invention is to provide for the variable speed of driven shafts through the instrumentality of an easily operated selective locking means.

Another object resides in the provision of a speed changing mechanism embodying driven gears which are driven selectively by coöperative driving gears selectively locked for coöperation with the respective driven gears.

With the above and other objects in view, the present invention consists in the combination and arrangement of parts hereinafter more fully described, illustrated in the accompanying drawings, and particularly pointed out in the appended claims, it being understood that changes may be made in the form, proportion, size and minor details without departing from the spirit or sacrificing any of the advantages of the invention.

In the drawings:—Figure 1 illustrates the upper portion of a drill press with my invention applied thereto. Fig. 2 is a top plan view. Fig. 3 is a longitudinal sectional view through a portion of the countershaft to illustrate the selective gear locking mechanism.

Referring now more particularly to the accompanying drawings the reference character 1 indicates a portion of a drill press upon which are journaled the driving shaft 2, the driven shaft 3 and the countershaft 4, the countershaft 4 being preferably hollow and provided with a slot 5 for a purpose presently explained. The driving shaft 2 receives its motion from any suitable source (not shown) which may have connection with the drive wheel 6, and the driven shaft 3 is adapted to drive the drill spindle or other shaft 7 through the instrumentality of coöperating gears 8.

The driving and countershafts 2 and 4 respectively are connected together by the gears 9 and 10 mounted on the respective shafts 2 and 4, the gears of the respective shafts being adapted to be thrown into and out of speed-changing relation through the instrumentality of any suitable clutch mechanism, the type of which is immaterial for the purposes of this invention and is therefore not illustrated. Such clutch mechanism may be operated by the hand lever 12 pivoted at 13 on the arm 14. These gears 9 and 10 are designed to increase or decrease the speed of the countershaft 4 relative to the driving shaft 2.

Fixedly mounted on the driven shaft 3 are spur gears 15 adapted for alinement and mesh with the gears 16 loosely mounted upon the hollow countershaft 4.

Slidably mounted within the countershaft 4 is a member 17 provided with a recess 18 in which is pivoted intermediate its ends, as at 19, a locking lever 20 having one end provided with a projecting portion 22 adapted to extend through the aforesaid slot 5 of the hollow countershaft and engage the groove 23 in the respective gears 16, as clearly shown in Fig. 3. It will be understood that the projecting portion 22 of the locking lever 20 normally projects through the slot 5, by virtue of the spring 20′ for engagement in the several grooves 23 formed in the hubs of each of the gears 16, the gears 16 being preferably spaced by collars 24 adapted to prevent the locking lever from engaging the grooves of adjoining wheels at the same time.

The shiftable member 17 is provided with a handle 25 whereby it may be shifted backwardly and forwardly in the countershaft 4 and this member 17 and its handle 25 are prevented from rotating upon rotation of the countershaft by virtue of the arm 26 secured to the drill press 1 passing through the slot 27 of the handle 25, the arm 26 being provided with notches 28 in its lower edge for interchangeable engagement of the projection 29 on the lever 30 pivoted at 31 and having a portion 32 adapted to engage the head 33 of the rod 34 slidably mounted in the member 17 and which at its inner end has a beveled enlargement 35 adapted to engage the corresponding end of the locking lever 20 and shift it upon its pivot 19 to the dotted line position shown in Fig. 3 so that the locking lever will not be in locking relation with any of the gears 16. The spindle 34 is pressed normally outward by the spring 36 encircling the same and disposed within the hollow member 17. The upper end of the arm 32 of the lever 30 merely rests against the head 33 of the rod 34 and does not interfere with the latter as it rotates with the countershaft 4.

The coöperative relation between the lever 30 and the arm 26 provides for an indication as to the proper distance to which the locking key must be shifted to engage a given gear, and while the handle 25 may be loosely mounted on the end of the shifting member 17, it is prevented from rotating during rotation of the countershaft by reason of the arm 26 extending through the opening 27 of the handle, as before stated.

What is claimed is:—

1. In a device of the character described, a hollow shaft provided with a slot, gears mounted loosely on the shaft, a member slidably mounted in the shaft and provided with a recess, a locking lever pivotally mounted in the recess and adapted to project through said slot for selective engagement with said gears, and a spring controlled rod operable for engagement with the locking lever to shift it out of locking position.

2. In a device of the character described, a hollow shaft provided with a slot, gears loosely mounted on the shaft, a member slidably mounted in the shaft and provided with a recess, a lever pivotally mounted in the recess of the sliding member and having a portion adapted to project through the slot of the hollow shaft for engagement with and to selectively lock the loose gears to the shaft, a handle loosely mounted on the slidable member for operating the latter, said handle having an opening, an arm extending through said opening to prevent rotation of the slidable member, a rod carried by the slidable member and having a portion arranged for engagement with said lever to throw the latter out of operative position, and a lever for engagement with the rod to operate the latter to throw the locking lever out of operative position.

3. In a device of the character described, a hollow shaft provided with a slot, gears mounted loosely on the shaft, a member slidably mounted in the shaft and provided with a recess, a locking lever pivotally mounted in the recess for selective engagement with said gears, and a rod mounted in the slidable member and provided at its inner end with a beveled face adapted for engagement with the locking lever to shift the latter out of coöperative engagement with said gears.

4. In a device of the character described, a hollow shaft provided with a slot, gears loosely mounted on the shaft, a member slidably mounted in the shaft and provided with a recess, a lever pivotally mounted in the recess of the sliding member and having a portion adapted to project through the slot of the hollow shaft for engagement with and selectively lock the loose gears to the shaft and also to lock the slidable member rotatably to the shaft, a handle loosely mounted on the slidable member for operating the latter, said handle having an opening, an arm extending through said opening to prevent rotation of the handle during rotation of the slidable member, a spring actuated rod carried by the slidable member and having a portion arranged for engagement with said lever to throw the latter out of operative position, and a lever extending through the opening of the aforesaid handle and having an arm for engagement with the rod to operate the latter to throw the locking lever out of operative position.

5. In a device of the character described, a hollow shaft provided with a slot, gears loosely mounted on the shaft, a member slidably mounted in the shaft and provided with a recess, a lever pivotally mounted in the recess of the sliding member and having a portion adapted to project through the slot of the hollow shaft for engagement with and to selectively lock the loose gears to the shaft, a handle loosely mounted on the slidable member for operating the latter, said handle having an opening, an arm extending through said opening to prevent rotation of the handle during rotation of the sliding member, a spring actuated rod carried by the slidable member and having a portion arranged for engagement with said lever to throw the latter out of operative position, and a lever for engagement with the rod to operate the latter to throw the locking lever out of operative position.

6. In a device of the character described, a hollow shaft provided with a slot, gears loosely mounted on the shaft, a member slidably mounted in the shaft and provided with a recess, a lever pivotally mounted in the recess of the sliding member and having a portion adapted to project through the slot of the hollow shaft for engagement with and to selectively lock the loose gears to the shaft, a handle loosely mounted on the slidable member for operating the latter, said handle having an opening, an arm extending through said opening to prevent rotation of the handle during rotation of the slidable member, a rod carried by the slidable member and having a portion arranged for engagement with said lever to throw the latter out of operative position, and a lever for engagement with the rod to operate the latter to throw the locking lever out of operative position, said arm having notches and said lever having a projection adapted to engage the notches to determine the position of the locking lever with respect to the gears.

7. In a device of the character described, a hollow shaft provided with a slot, gears loosely mounted on the shaft, a member slidably mounted in the shaft and provided with a recess, a lever pivotally mounted in the recess of the sliding member and having a portion adapted to project through the slot of the hollow shaft for engagement with and to selectively lock the loose gears to the shaft and also to lock the slidable member rotatably to the shaft, a handle loosely mounted on the slidable member for operating the latter, said handle having an opening, an arm extending through said opening to prevent rotation of the handle during rotation of the slidable member, a spring actuated rod carried by the slidable member and having a portion arranged for engagement with said lever to throw the latter out of operative position, and a lever extending through the opening of the aforesaid handle and having an arm for engagement with the rod to operate the latter to throw the locking lever out of operative position, said arm having notches and said lever having a projection adapted to engage the notches to determine the position of the locking lever with respect to the gears.

8. In a device of the character described, a hollow shaft provided with a slot, a set of gears loosely mounted on the shaft, a member slidably mounted in the shaft and provided with a recess, a lever pivotally mounted in the recess of the slidable member and having a portion adapted to project through the slot of the shaft for selective engagement with said gears to lock them to the shaft and also to lock the slidable member rotatably to the shaft, a handle loosely mounted on the slidable member for operating the latter, said handle having an opening, an arm extending through said opening to prevent rotation of the handle during rotation of the slidable member, a spring actuated rod carried by the slidable member and having a portion arranged for engagement with said lever to operate it to throw its projecting portion inwardly of the hollow shaft through the slot of the latter, a lever extending through the opening of the aforesaid handle and having an arm for engagement with the rod to operate the latter to throw the locking lever out of operative position, said arm having notches and said lever having a projection adapted to engage the notches to determine the position of the locking lever with the respective gears, and spacing collars between the gears to prevent the locking lever engaging adjacent gears.

9. In a device of the character described, a rotatable shaft, a set of gears loosely mounted on the shaft, a spring controlled locking lever carried by the shaft for selective engagement with said gears to lock them selectively on the shaft, and a spring controlled rod operable for engagement with the locking lever to shift it out of locking position against the action of its spring.

In testimony whereof I affix my signature, in presence of two witnesses.

WILLIAM H. HOLLAND.

Witnesses:
G. M. COLE,
L. D. WAHLEN.